(12) United States Patent
Jäck

(10) Patent No.: US 6,797,915 B2
(45) Date of Patent: Sep. 28, 2004

(54) METHOD AND DEVICE FOR JOINING COATED METAL SHEETS BY MEANS OF LASER WELDING

(75) Inventor: Kurt Jäck, Aulendorf (DE)

(73) Assignee: Nothelfer GmbH, Ravensburg (DE)

( * ) Notice: Subject to any disclaimer, the term of this patent is extended or adjusted under 35 U.S.C. 154(b) by 0 days.

(21) Appl. No.: 10/470,929

(22) PCT Filed: Mar. 6, 2002

(86) PCT No.: PCT/EP02/02409

§ 371 (c)(1),
(2), (4) Date: Jul. 31, 2003

(87) PCT Pub. No.: WO02/081140

PCT Pub. Date: Oct. 17, 2002

(65) Prior Publication Data

US 2004/0050829 A1 Mar. 18, 2004

(30) Foreign Application Priority Data

Apr. 5, 2001 (DE) ........................................ 101 16 919

(51) Int. Cl.⁷ .............................................. B23K 26/24
(52) U.S. Cl. .............................. 219/121.64; 219/121.63
(58) Field of Search ........................ 219/121.63, 121.64

(56) References Cited

U.S. PATENT DOCUMENTS 4,682,002 A * 7/1987 Delle Piane et al. .... 219/121.64
4,745,257 A   5/1988 Rito et al.
6,060,681 A   5/2000 Bachhofer et al.

FOREIGN PATENT DOCUMENTS

| DE | 38 12 448 | 6/1989 |
|---|---|---|
| DE | 42 19 549 | 12/1993 |
| DE | 44 03 999 | 8/1995 |
| DE | 197 05 278 | 2/1998 |
| DE | 198 54 217 | 6/2000 |
| DE | 199 32 415 | 2/2001 |
| EP | 0 438 612 | 7/1991 |
| JP | 2001-162387 A * | 6/2001 |
| WO | WO-99/08829 A1 * | 2/1999 |

* cited by examiner

*Primary Examiner*—Geoffrey S Evans
(74) *Attorney, Agent, or Firm*—McGlew and Tuttle, P.C.

(57) ABSTRACT

A method and device for joining coated metal sheets by laser welding is provided in which the metal sheets (1, 2) are placed one on top of another such that the marginal strip (4) of one metal sheet (2) protrudes over the marginal strip (3) of the other metal sheet (1). The marginal strips (3, 4) are pressed together at least in some areas and are joined by laser welding with a laser beam (14) directed at right angles or at about right angles to the plane of the marginal strips (3, 4). The protruding marginal strip (4) is pushed away from the other marginal strip (3) during the laser welding to form a degassing space (10).

20 Claims, 5 Drawing Sheets

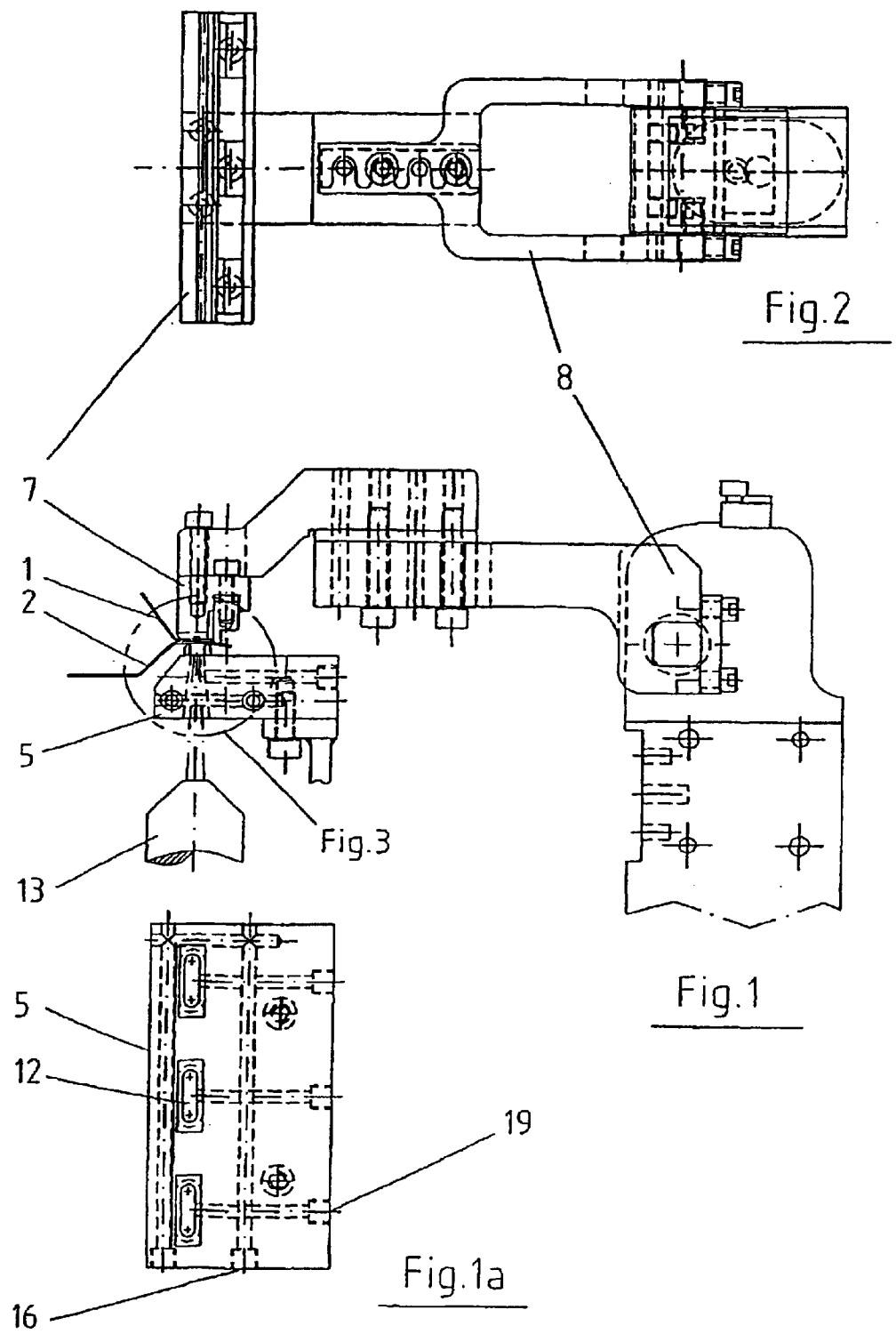

US 6,797,915 B2

METHOD AND DEVICE FOR JOINING COATED METAL SHEETS BY MEANS OF LASER WELDING

FIELD OF THE INVENTION

The present invention pertains to a method for joining coated metal sheets by means of laser welding in which the metal sheets are placed one on top of another such that the marginal strip of one metal sheet protrudes over the marginal strip of the other metal sheet and the marginal strips are pressed together at least in some areas and are joined by laser welding with a laser beam directed at right angles or essentially at right angles to the plane of the marginal strips. The present invention also pertains to a device for carrying out the method.

BACKGROUND OF THE INVENTION

Coated metal sheets are used, e.g., for the manufacture and assembly of motor vehicle bodies. The coating material may consist of zinc or the like and has a lower melting point than the metal sheet material. To prevent the coating material from entering the weld pool, it is known that a degassing space originating from the weld seam may be provided. Such a suggestion (DE 38 12 448 C1; DE 198 54 217 A1) goes so far as to use coated metal sheets that are preformed such that they lie one on top of another in the joining area along the weld seam with different radii of curvature and form a degassing space as a result. According to another suggestion (DE 199 32 415 C1), the marginal strips shall have preformed impressions and be pressed together, lying one on top of another, only in the area of these impressions. All this is complicated, because it requires the prior deformation of the coated metal sheets to be joined together.

A method and a device for the laser welding of metal sheets overlapping each other to form a flange seam, in which the welding is brought about by a laser beam located in the plane of the flange seam, while a welding rod is fed, is known from DE 197 05 278 C1. The metal sheets are spread apart here in a position located in front of the laser beam in the welding direction simultaneously with the process, and the laser beam is irradiated into the area of the gap bottom of the spread-apart surface. No degassing space is provided here.

SUMMARY OF THE INVENTION

The object of the present invention is to make degassing possible in a simple manner.

According to the present invention a method for joining coated metal sheets by means of laser welding is provided in which the metal sheets are placed one on top of another such that the marginal strip of one metal sheet protrudes over the marginal strip of the other metal sheet and the marginal strips are pressed together at least in some areas and are joined by laser welding with a laser beam directed at right angles or essentially at right angles to the plane of the marginal strips. The protruding marginal strip is pushed away from the other marginal strip during the laser welding to form a degassing space. It is usually sufficient for the protruding marginal strip to be pushed away from the other marginal strip under elastic deformation. A wedge-shaped, acute-angled degassing space is obtained, through which the coating material, which is in the form of a vapor, can escape. Preforming of the metal sheets is not necessary.

According to another aspect of the present invention a device for carrying out the method is provided with a support for the two marginal strips placed one on top of another and with a pressing piece that can be moved against and toward the support.

The device has a holding-down device that can be moved in relation to the protruding marginal strip, arranged at or next to the pressing piece. If the pressing piece is lowered onto the marginal strip of the metal sheets to be joined together, which marginal strip is arranged on the support, and the marginal strips are clamped as a result, the protruding marginal strip is also pushed away at the same time from the other marginal strip while the degassing space is formed. The holding-down device is connected for this purpose to the pressing piece and is arranged in the area of the projection of the marginal strip. It is recommended that the holding-down device be arranged adjustably at the pressing piece in order for the deflection of the protruding marginal strip to be able to be adapted to the particular conditions prevailing during the operation.

The pressing piece and/or the support may have at least one opening for a focused laser beam, depending on whether the laser beam shall be directed toward the metal sheet from the top or from the bottom. To make welding through possible, the support or the pressing piece may have a recess, which corresponds to the opening in the other component. The pressing piece and/or the support may also be cooled. Furthermore, a gas feed line opening into the opening may be provided.

In another embodiment, the pressing piece is a roller acting on the narrower marginal strip, and a holding-down roller acting on the projection of the protruding marginal strip is provided. If the rollers have different diameters, they may be arranged coaxially. The rollers may be preferably arranged on a movable component (e.g., a robot) with a laser welding means, in which case the movable component must also generate the necessary pressing pressure between the roller and the support.

Exemplary embodiments of the present invention, which are shown in the drawings, will be explained below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1 is a schematic view showing a device according to the present invention and partially the view thereof;

FIG. 1a is a top view of the support;

FIG. 2 is a bottom view of the clamping means and the pressing piece (corresponding to FIG. 1);

DESCRIPTION OF THE PREFERRED EMBODIMENTS

Figure 3:
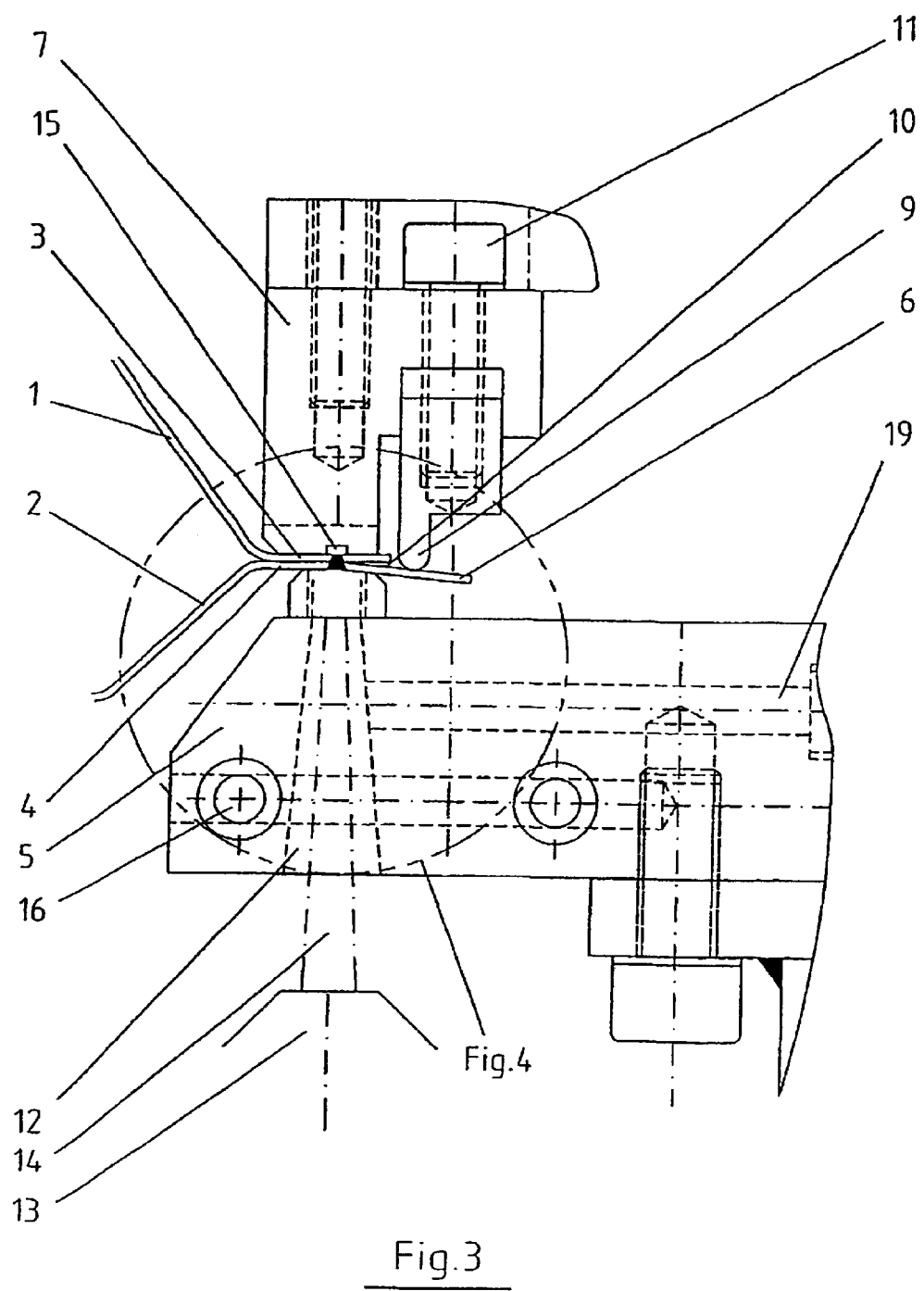
FIG. 3 is an enlarged detail view from FIG. 1.

Referring to the drawings in particular, the device shown is used to join coated metal sheets 1, 2 by laser welding. The metal sheet 1 has a narrower marginal strip 3, and the metal sheet 2 has a broad marginal strip 4 (cf. FIGS. 3 and 4). The marginal strips 3, 4 are placed on a support 5 such that the marginal strip 4 lying directly on the support 5 protrudes over the narrower marginal strip 3 with a projection 6.

A pressing piece 7, which can be moved against the support 5 with a clamping means 8, which is only outlined, clamps the two marginal strips 3, 4 against each other in the position shown. In the area of the projection 6, the pressing piece 7 has on its underside a holding-down device 9, which pushes the projection 6 and hence the broader marginal strip 4 away from the narrower marginal strip 3, so that a wedge-shaped degassing space 10 is formed. The holding-down device 9 can be set by means of an adjusting screw 11, so that the deflection of the projection 6 and consequently of the marginal strip 4 can be adapted to the conditions prevailing during the operation.

The projection may advantageously have a width of 2 mm to 4 mm. The deflection of the projection 6 at the free end of the degassing space 10 may advantageously be 0.1 mm to 0.2 mm.

In the view in FIGS. 1, 3 and 4, the support 5 has at least one through opening 12 (three openings 12 in the embodiment being shown) in order to make possible the passage of a focused laser beam 14 emitted by a laser welding means 13, which is only outlined, from below to the marginal strips 3, 4. The laser welding means 13 is arranged on a component, e.g., a robot, not shown in FIGS. 1 through 4. The vapors of the coating material of the metal sheets 1, 2, which are released during the welding, can escape during welding through the degassing space 10.

Figure 4:
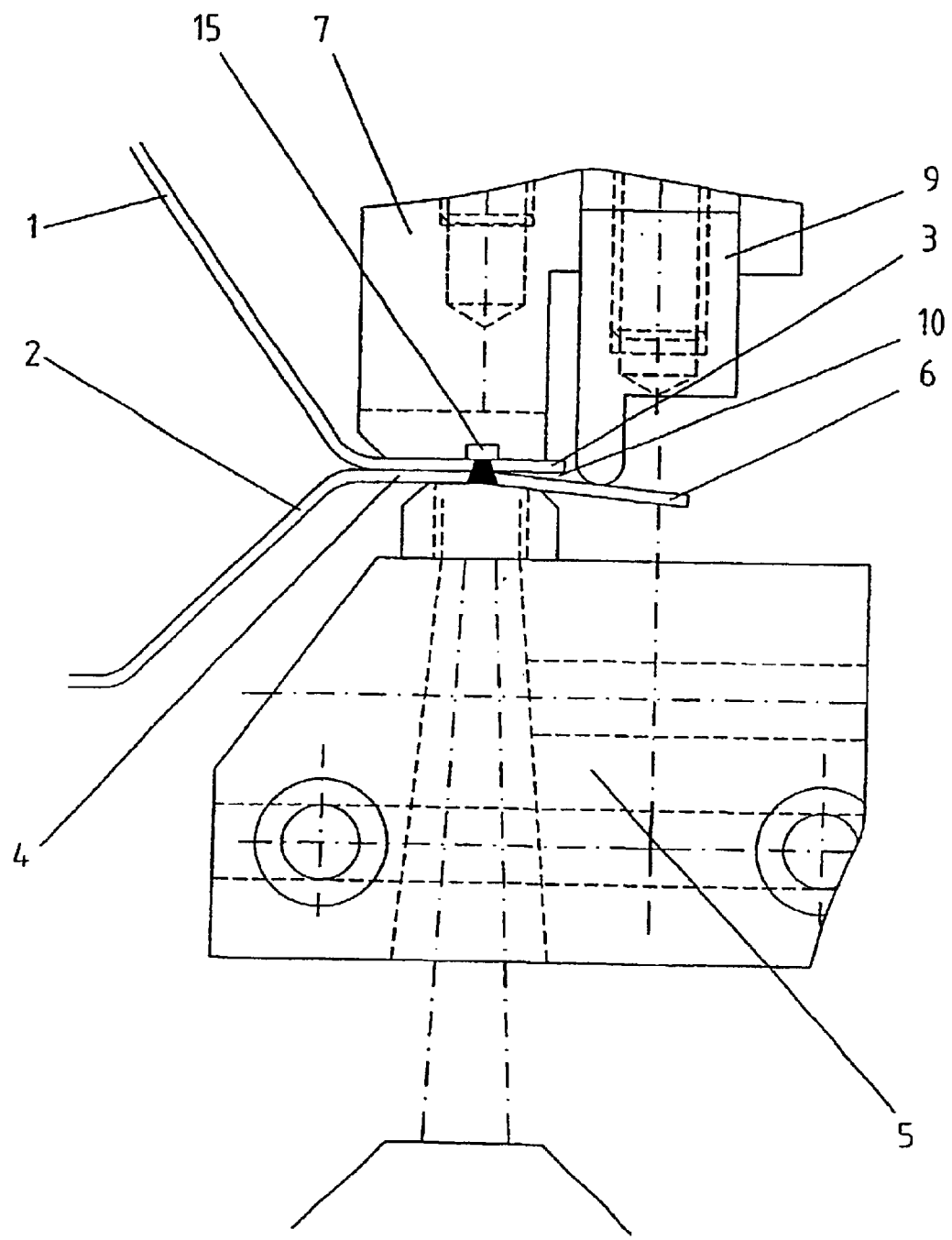
FIG. 4 is an even more greatly enlarged detail view from FIG. 3.
Figure 5:
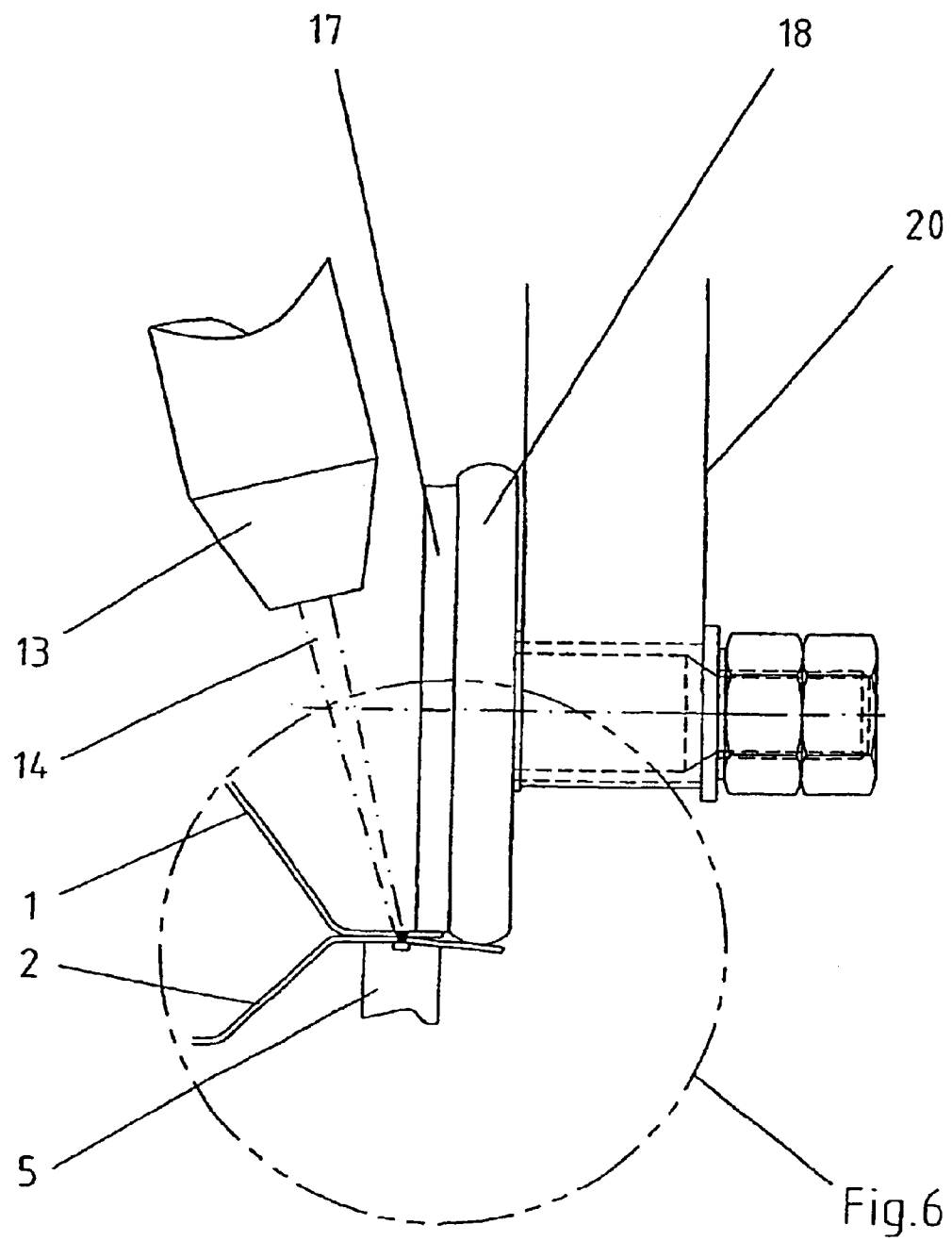
FIG. 5 is an enlarged view of another embodiment of the subject according to FIG. 1.
Figure 6:
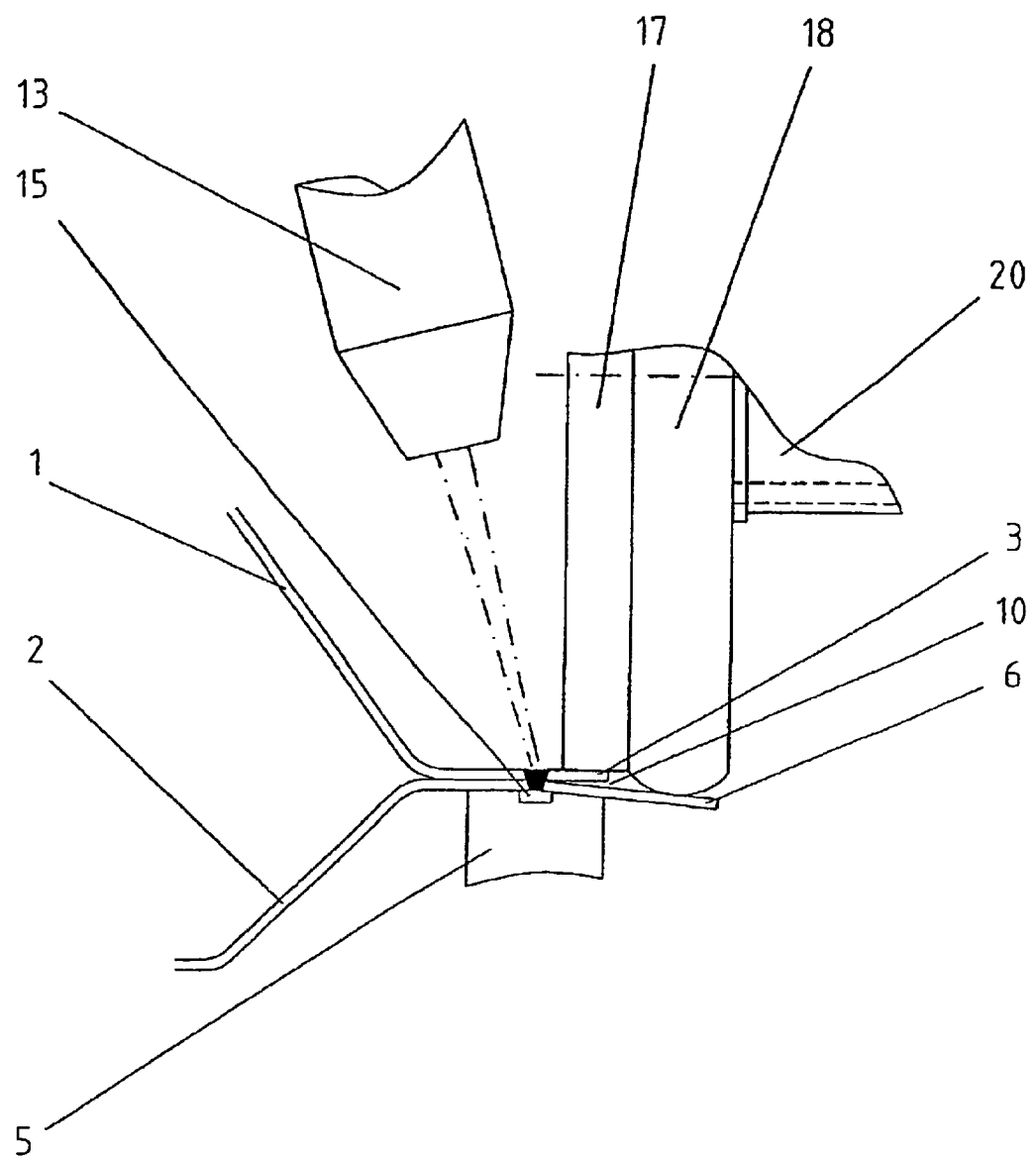
FIG. 6 is an enlargement from FIG. 5.

To make through welding possible, the pressing piece 7 in the embodiment shown in FIGS. 1, 3 and 4 and the support 5 according to FIGS. 5 and 6 have a recess 15. Cooling channels 16 and gas feed lines 19 are also provided in the support 5.

Identical reference numbers designate identical parts in the embodiment shown in FIGS. 5 and 6. The laser beam 14 is directed in the embodiment of FIGS. 5 and 6 from the top toward the marginal strip 3 of the metal sheet 1. A roller 17, which is arranged, just like the laser welding means 13, on a movable component 20, e.g., a robot, which is only outlined, is provided as a pressing piece. The movable component 20 also must apply the necessary pressing pressure. Next to the roller 17, a holding-down roller 18 is arranged, which has a somewhat larger diameter than the roller 17 and is arranged coaxially with the roller 17 such that it deflects the projection 6 of the lower marginal strip 4 during the welding to form the degassing space 10.

While specific embodiments of the invention have been shown and described in detail to illustrate the application of the principles of the invention, it will be understood that the invention may be embodied otherwise without departing from such principles.

What is claimed is:

1. A method for joining coated metal sheets by means of laser welding, the method comprising:
    placing the metal sheets one on top of another such that the marginal strip of one metal sheet protrudes over the marginal strip of the other metal sheet;
    pressing the marginal strips together, lying one on top of another, at least in some areas in the area of the weld seam to be prepared;
    joining the metal sheets by laser welding with a laser beam (14) directed at right angles or essentially at right angles to the plane of the marginal strips;
    pushing the projection of the protruding marginal strip away from the other marginal strip by the elastic deformation of the projection during the laser welding to form a degassing space (10) during the laser welding.

2. A device for joining coated metal sheets by means of laser welding, the device comprising:
    a support for the two marginal strips lying one on top of another in an area of the weld seam to be prepared;
    a pressing piece movable in relation to the support;
    at least one holding-down device movable in relation to the projection of the marginal strip and pushing the projection away from the other marginal strip by elastic deformation, the holding-down device being arranged at or next to the pressing piece in the area of the projection of the marginal strip.

3. A device in accordance with claim 2 further comprising:
    a gas feed line opening into the opening.

4. A device in accordance with claim 2, wherein the holding-down device is rigidly connected to the pressing piece.

5. A device in accordance with claim 2 wherein the holding-down device is arranged adjustably at the pressing piece.

6. A device in accordance with claim 2, wherein the pressing piece and/or the support has at least one opening for a focused laser beam.

7. A device in accordance with claim 2, wherein the support or the pressing piece has a recess corresponding to the opening in the other component.

8. A device in accordance with claim 2, wherein the pressing piece and/or the support are cooled.

9. A device in accordance with claim 2, wherein the pressing piece is a roller acting on the narrower marginal strip, and that a holding-down roller acting on the projection (6) of the protruding marginal strip is provided.

10. A device in accordance with claim 9, wherein the rollers are arranged on a movable component together with a laser welding means.

11. A device in accordance with claim 9, wherein the rollers have different diameters and are arranged coaxially.

12. A device for welding coated metal sheets, the device comprising:
    a pressing means for holding a first marginal strip of a first metal sheet against a second marginal strip of a second metal sheet in a weld region where a weld is to be made, wherein said second marginal strip extends with an extension out beyond an edge of said first marginal strip;
    a deflecting means for contacting said second marginal strip in an area of said extension and deflecting by mechanical force said second marginal strip away from said first marginal snip forming a gap between at least a portion of said first and second marginal strips, said gap originating in said weld region and increasing towards an outside edge of said first marginal strip; and
    a laser welding means for applying laser welding energy to said metal sheets in an area of said weld region.

13. A device in accordance with claim 12, wherein said pressing means, said deflecting means and said laser welding means are mounted on a movable platform.

14. A device according to claim 12, further comprising:
    a recess in said pressing means forming a gap between a portion of said pressing means and said metal sheets in a location of application of said welding energy.

15. A device according to claim 12, wherein said pressing and said deflecting means are in the form of rollers which progressively move along said marginal strips.

16. A device according to claim 12, wherein said pressing means has an opening through which said laser welding energy is applied to said metal sheet.

17. A device in accordance with claim 12, wherein said pressing means is cooled.

18. A method of forming a laser weld between coated metal sheets comprising the steps of:

forming marginal strips on the metal sheets to be welded with one marginal strip of one metal sheet extending beyond another marginal strip of another metal sheet;

pressing said marginal strips together in a region where a laser weld is to be made;

either simultaneous with said pressing or subsequent to said pressing, forcing said one marginal strip of said one metal sheet that is extending beyond said another marginal strip of said another metal sheet to form a gap originating from a region where a weld is to be made to an outside edge of said another marginal strip; and laser welding, with a laser welding means, said marginal strips where they are pressed together with the metal coating escaping from the weld through said gap.

19. A method of forming a laser weld in accordance with claim 18 wherein said pressing and said forcing of said marginal strips is performed by an element comprised of one or more roller profiles.

20. A method of forming a laser weld according to claim 18 wherein the method is performed in a continuous manner using rollers to perform said pressing.

* * * * *